United States Patent [15] 3,689,580
Hall et al. [45] Sept. 5, 1972

[54] PREPARATION OF HALODIENES

[72] Inventors: David W. Hall, Vancouver, Canada; Ed Hurley, Jr., Littleton, Colo.

[73] Assignee: Marathon Oil Company, Findlay, Ohio

[22] Filed: Aug. 30, 1968

[21] Appl. No.: 756,367

Related U.S. Application Data

[63] Continuation-in-part of Ser. No. 502,466, Oct. 22, 1965, abandoned.

[52] U.S. Cl.........260/655 R, 260/614 A, 260/632 B, 260/651 R, 260/654 R
[51] Int. Cl.............................................C07c 21/20
[58] Field of Search...260/654, 655, 651, 614, 614 A

[56] References Cited

UNITED STATES PATENTS 3,021,373 2/1962 Montagna et al..........260/614
3,023,250 2/1962 Montagna et al..........260/614
3,360,583 12/1967 Hall et al. ..............260/655 X

FOREIGN PATENTS OR APPLICATIONS

39/3414 11/1964 Japan.......................260/614

OTHER PUBLICATIONS

Balug et al., Chem. Abst. 54 (1960) 1,283e
Bindacz et al., Chem. Abst. 54 (1960) 24,368– 24,369

Primary Examiner—Howard T. Mars
Attorney—Sughrue, Rothwell, Mion, Zinn & Macpeak

[57] ABSTRACT

A process for preparing a halodiene compound by reacting an alpha-haloether with an acetylene to form a haloether adduct of the acetylene and splitting alcohol from the haloether adduct to form a halodiene compound.

13 Claims, No Drawings

PREPARATION OF HALODIENES

This application is a continuation-in-part of U.S. Ser. No. 502,466, filed Oct. 22, 1965 and now abandoned.

This invention relates to the preparation of polyenes and more particularly to the preparation of these materials by reacting halo-substituted ethers with acetylenes, splitting the resulting haloether adduct, and recovering the resulting polyolefinic compound.

Conjugated di-olefins are important to the elastomer and insecticide industries, and better processes for the preparation of these important monomers are needed. This invention provides a method for the preparation of these important chemicals from simple raw materials.

Essentially, the invention comprises reacting an alpha-haloether with a substituted acetylene to form a haloether adduct of the acetylene and splitting out alcohol from the haloether adduct to form a conjugated polyolefin.

A variety of alpha haloethers are useful in this process. Alpha-monohalo lower alkane ethers, either unsymmetrical or symmetrical, are preferred. If conjugated polyenes are to be prepared, the haloether must have a sufficient number of carbon atoms to allow addition, cleavage, and diene formation. Preferably, the haloethers are substituted in the alpha position with chloro, bromo, or iodo and are methyl, ethyl, or propyl ethers. Alpha-haloethers useful in this process include symmetrical haloethers, such as bis(chloromethyl)ether, bis(alpha-bromoethyl)ether, bis(alpha-iodopropyl)ether; unsymmetrical ethers, such as alpha, beta-dichloro diethyl ether, chloromethyl methyl ether, dichloromethyl methyl ether, chloromethyl dodecyl ether, chloromethyl p-methoxyphenyl ether, chloromethyl p-chlorophenyl ether, alpha-bromomethyl ethyl ether, alpha-iodomethyl propyl ether, chloromethyl phenyl ether, etc.; and cyclic ethers, such as 2, 5-dichlorotetrahydrofuran, alpha-phenyl-alpha-chloromethyl pyrocatechol, 2,3-dichlorotetrahydropyran, etc. and monochloroethylene carbonate.

Reactive acetylenes useful in this process are those which are not spatially or sterically prevented from reacting with a desired haloether under a given set of reaction conditions. Useful acetylenes include the halogen-substituted acetylenes such as dibromoacetylene, dichloroacetylene, fluoroacetylene, idoacetylene, etc.; alkyl substituted acetylenes such as methylacetylene, 1-butyne, 2-butyne, isopropylacetylene, 2-methyl-3-butyne, etc.; and aromatic substituted acetylenes such as phenyl-acetylene, 1-phenyl-1-propyne, benzylacetylene, p-(chloroacetylenyl) toluene, 1-tolylacetylene, etc. Isomers of acetylenes, such as allene, and mixtures of acetylenes and their isomers, such as a mixture of methylacetylene and allene, are also useful in this process. Preferred acetylenes are the halogen and hydrocarbon acetylenes having from two to nine carbon atoms.

The addition of the haloether to the acetylene is conducted in the presence of a catalyst. Generally, Friedel-Crafts catalysts are operative in the process of this invention. Preferred catalysts include zinc chloride, mercuric chloride, aluminum chloride, titanium chloride, and ferric chloride.

The haloether adduct preparation is preferably accomplished in the liquid phase. A gaseous acetylene can be sparged through a liquid ether or a solid ether in solution in an inert solvent. Alternatively, the reactants can be run countercurrent through a column packed with catalyst in a continuous process. Generally, the reaction goes well at room temperature. A preferred temperature range is from about −20°C to about 70°C and a more preferred range is from about 0°C to about 25°C. Generally, a solvent is not necessary in the haloether adduct formation though, where required, solvents may be employed. Solvents, such as chloroalkanes, for example, methylene chloride, and alkane ethers, such as diethyl ether, can be utilized for solid acetylenes or haloethers where sufficient heat to melt the solids is not available or the required heat is uneconomic.

As indicated above, the haloether adduct is cleaved to form the desired conjugated polyene. The cleavage can be conducted in several ways. The haloether adduct can be thermally cleaved by passing it through a heated tube, which can be packed with an inert material, such as ceramic or glass beads, to increase contact area. Alternatively, the tube can be packed with a cleavage promoting catalyst. Suitable catalysts include silica and alumina catalysts of the type commonly used to promote alcohol dehydration to olefins at elevated temperatures. Clays possessing structures similar to the aluminas may also be used.

The yield of conjugated polyene is improved by adding a hydrogen halide to the haloether adduct before the thermal treatment or, alternatively, during the passage of the adduct through the heated tube. Suitable halides include hydrogen chloride, hydrogen bromide, and hydrogen iodide. The hydrogen halide is in the form of a gas. At least one mole of hydrogen halide per mole of haloether adduct should be used unless the acid is recycled to the column. Hydrogen chloride is preferred. In order to prevent the addition of the acid to the conjugated polyene, the wash solutions used to isolate the product can contain dilute caustic or basic organic agents, preferably N-methyl-pyrrolidone.

Although the temperature of thermal cleavage will vary with the particular haloether adduct being treated, temperatures of from about 150°C to about 600°C are generally sufficient to effect cleavage of the haloether adduct to conjugated polyene and alcohol. The conjugated polyene, alcohol, and unchanged haloether adduct are collected from the tube exit by a series of cold traps and/or wash baths. While the haloether adduct may simply be transferred to the heated tube, in a preferred embodiment the adduct is distilled at a pressure of less than 300 millimeters of mercury into the heated tube. As a general rule, the halodiene distillation is preferably conducted at a pressure of from 100 to 400 millimeters of mercury absolute pressure, and more preferably in the range of from 200 to 360 millimeters of mercury absolute pressure, and most preferably at 300 millimeters $H_g$ absolute pressure. In the case of chloroprene, as indicated, a temperature of 33°C at 300 millimeters absolute is utilized. The low pressure distillation inhibits the spontaneous polymerization of the conjugated polyene and thereby increases the yield to this desired monomer. It is believed that the tendency of chloroprene and related compounds to polymerize is well known in the art. Reference may be made to the Kirk-Othmer Encyclopedia of Chemical Technology, Second Edition, Volume 5, Interscience Publishers, page 216 to 220, for some of the characteristics of this chain of compounds.

Cleavage of the haloether adduct can also be accomplished by heating it in the presence of N-methylpyrrolidone containing anhydrous HCl. While the amount of N-methylpyrrolidone can vary, good results are obtained when at least 3 moles of N-methylpyrrolidone per mole of haloether adduct are used. There is no particular advantage in using more. Good results are obtained when the N-methylpyrrolidone contains up to one mole of hydrogen halide/mole of N-methylpyrrolidone and preferably between about 0.2 and about 0.5 mole of HCl per mole of N-methylpyrrolidone. Heating at a temperature in the range of from about 140°C to about 170°C is effective.

When the adduct is cleaved by refluxing in N-methylpyrrolidone containing HCl the yield of conjugated polyene can be increased by conducting the cleavage in the presence of a metal halide. The previously mentioned Friedel-Crafts catalysts used to catalyze the addition of haloether to acetylene can be used for this purpose. Additionally, an alkali metal halide, such as lithium chloride, can be added to the adduct to promote cleavage upon refluxing.

The conjugated polyene is separated from the alcohol split from the haloether adduct by conventional techniques such as extraction, distillation, etc.

The process has been described above in its broader aspects. It will now be described in terms of a specific process for producing chloroprene. The mechanisms and techniques described in this process are applicable to the preparation of other conjugated polyenes from other raw materials as previously indicated.

The commercial process currently used to produce chloroprene is based on the reaction of hydrogen chloride with vinyl acetylene. The major disadvantage of this process is the explosive nature of vinyl acetylene. Although this reaction produces high yields of chloroprene without the production of substantial amounts of by-product tars, the cost of chloroprene is increased by the necessity of employing equipment which will protect against the explosion hazard.

In accordance with this invention, chloroprene can be obtained from inexpensive, readily available, and relatively non-explosive starting materials. This is accomplished by employing chloromethyl methyl ether and methylacetylene as the starting materials for the production of chloroprene. Methylacetylene is less explosive than vinyl acetylene or unsubstituted acetylene. Allene, an isomer of methylacetylene, and mixtures of allene and methylacetylene can also be used in lieu of methylacetylene in accordance with this invention.

Methylacetylene and chloromethyl methyl ether are reacted to produce an adduct, 4-methoxy-2-chloro-2-butene, which is then cleaved to produce 2-chloro-1,3-butadiene and methanol. The addition of chloromethyl methyl ether to methylacetylene is catalyzed by a Friedel-Crafts catalyst.

In forming the initial reaction mixture, a suitable catalyst is added to a vessel containing chloromethyl methyl ether. In a preferred commercial embodiment of this invention, the chloromethyl methyl ether is generated by the reaction of formaldehyde, methanol and hydrogen chloride. Any readily available source of formaldehyde can be employed. These sources include trioxane, paraformaldehyde, methanol solutions of formaldehyde, and aqueous solutions of formaldehyde. The formaldehyde and methanol are mixed in equal molar amounts. However, lesser or greater amounts of each material may be used, although this may decrease the efficiency of the process. Hydrogen chloride is then added to the mixture of formaldehyde and methanol. Preferable, gaseous hydrogen chloride is bubbled through the formaldehyde methanol mixture, although other sources of hydrogen chloride, such as chlorosulfonic acid can be employed. The hydrogen chloride addition is accomplished at a temperature of from −20° to +35°C and preferably at a temperature of from 0° to 25°C.

The reaction of formaldehyde, methanol and hydrogen chloride forms a two phase reaction product. The lower phase, containing hydrochloric acid and minor amounts of formaldehyde and methanol, is removed and distilled to recover the materials contained therein for recycle. The upper phase consists primarily of chloromethyl methyl ether, and minor amounts of methylal and bis(chloromethyl)ether. Any reference to chloromethyl methyl ether in this specification or in the appended claims is intended to include both a preformed sample of chloromethyl methyl ether and the upper phase from the described reaction for generating the chloromethyl methyl ether.

The catalyst which is added to the chloromethyl methyl ether, can be any Friedel-Crafts catalyst which does not cause decomposition of the starting materials under the conditions employed. The preferred catalysts are zinc chloride, mercuric chloride and aluminum chloride. Titanium tetrachloride and ferric chloride can also be used. Preferably, between 0.005 and 0.05 mole of catalyst per mole of chloromethyl methyl ether is employed. When the chloromethyl methyl ether is generated from formaldehyde, about 85 percent to 95 percent of the charged formaldehyde is converted to chloromethyl methyl ether with most of the remainder in the bottom phase mentioned above. It has been found that between 0.005 and 0.05 moles of catalyst per mole of initial formaldehyde gives good results.

After the addition of the catalyst to the chloromethyl methyl ether, methylacetylene is added at a temperature of between −20°C and +55°C, preferably at a temperature of between 0° and 25°C, to form the 4-methoxy-2-chloro-2-butene adduct. This addition is easily accomplished by bubbling a stream of methylacetylene through the mixture, or by adding chloromethyl methyl ether to the methylacetylene. When the chloromethyl methyl ether is added to methylacetylene, the methylacetylene can be liquefied by maintaining it under pressure or dissolved in a solvent, such as diethyl ether. The reaction can be conducted in the presence of an inert diluent, such as methylene chloride or diethyl ether. The amounts of methylacetylene are not critical, but a complete reaction will not be obtained unless one mole of methylacetylene per mole of chloromethyl methyl ether is used. It is preferred to employ a two to threefold excess of methylacetylene to chloromethyl methyl ether to ensure that substantially all of the chloromethyl methyl ether reacts. This will prevent the initial adduct from adding a second mole of chloromethyl methyl ether. The excess of methylacetylene will merely go unchanged and can be removed from the system by bubbling through it an inert gas, such as nitrogen or argon.

A stream of allene or mixtures of allene and methylacetylene can be used instead of the pure methylacetylene under similar conditions. When allene is employed, the adduct formed is 4-methoxy-2-chloro-1-butene. When mixtures of methylacetylene and allene are used, both 4-methoxy-2-chloro-2-butene and 4-methoxy-2-chloro-1-butene are formed.

After the addition reaction, the haloether adduct can be isolated. The reaction mixture is decanted onto ice or mixed with cold water to hydrolyze the Friedel-Crafts catalyst complex and form a two phase product. The organic phase is extracted with a suitable solvent, such as methylene chloride, and the extract distilled to isolate 4-methoxy-2-chloro-2-butene or 4-methoxy-2-chloro-1-butene depending upon whether methylacetylene or allene was used as the starting material. It is not essential that the haloether adduct be isolated prior to cleavage, but isolation is preferred, since it decreases the amount of by-products formed during cleavage.

The 4-methoxy-2-chloro-2-butene or 4-methoxy-2-chloro-1-butene is then cleaved to produce chloroprene and methanol. Cleavage is accomplished under the conditions described previously.

The following detailed examples illustrate certain preferred embodiments of the invention.

EXAMPLE I

A solution of 1.0 gram zinc chloride (.007 mole) in 40 grams of chloromethyl methyl ether (0.5 mole) is placed in a 250 milliliter flask. Gaseous methylacetylene is bubbled into the mixture at a flow rate of 80 cc/min. for 45 minutes (20 grams in 45 minutes) with the temperature of the reaction mixture maintained between 10°C and 20°C. Following this, the mixture is fractionally distilled at a pressure of 20 millimeters of mercury and a fraction boiling at 32°C is isolated. This fraction is distilled a second time and 10 grams of a fraction collected at 37.5°C to 38°C and 28 mm. is distilled at a pressure of 100 millimeters of mercury into a 1 inch by 18 inch Vigreaux column packed with ceramic beads and maintained at a temperature of 500°C. The effluent from the column is collected in a cold trap containing xylene (frozen) at a temperature of −78°C. The xylene solution obtained by warming the trap is distilled at a pressure of 180 millimeters mercury and 0.5 gram of 2-chloro-1,3-butadiene is obtained.

EXAMPLE II 67 grams of 95 percent paraformaldehyde (2.14 moles formaldehyde) and 67.8 grams of methanol (2.12 moles) are placed in a 500 milliliter flask. 3 moles of gaseous hydrogen chloride are bubbled into the solution (excess HCl was permitted to escape), which is maintained at 0°C by means of an ice bath, to form a two phase reaction product. The lower phase, containing hydrochloric acid with minor amounts of methanol and formaldehyde, is removed and distilled to recover the values therein which are recycled for further production of chloromethyl methyl ether.

6 grams of mercuric chloride (0.02 mole) are added to the upper phase which consists primarily of chloromethyl methyl ether. This phase is maintained at a temperature of between 0° and 20°C and gaseous methylacetylene bubbled therethrough at a flow rate of 128 cc/min. for 2 hours (85 grams added over a 2 hour period).

The reaction mixture is decanted onto 100 gram of ice. This mixture is stirred 15 minutes, and then the organic phase is separated and dried over anhydrous sodium sulfate. Distillation of the organic material at 20 mm. gives 113 grams of a fraction collected at 32°C. GLC analysis indicates this material is 80 percent 4-methoxy-2-chloro-2-butene.

Thus, about 90 grams of pure 4-methoxy-2-chloro-2-butene are obtained. Based on the amount of formaldehyde employed, a yield of 35 percent is obtained.

The 4-methoxy-2-chloro-2-butene is cleaved as in Example I to produce chloroprene.

The 4-methoxy-2-chloro-2-butene adduct formed by the reaction of chloromethyl methyl ether and methylacetylene can be cleaved by heating in the presence of N-methylpyrrolidone and anhydrous HCl.

EXAMPLE III 13.4 grams of 4-methoxy-2-chloro-2-butene (approximately 70 percent pure according to GLC analysis) is added to 90 grams of N-methylpyrrolidone, 3 grams of anhydrous HCl, and 5 grams of anhydrous lithium chloride in a 250 milliliter 3-neck-round-bottom flask. The flask is fitted with a nitrogen inlet, a thermometer, and a short upright chilled water condenser. An exit tube from the condenser leads to a collection trap cooled with a dry ice-acetone mixture. The reaction vessel is heated to a temperature of 145°C. and nitrogen passed through the reaction mixture at a rate such that only about one-half of the adduct charged initially is swept past the upright condenser during a four hour period. GLC analysis of the 5 grams of material collected in the trap establishes that approximately 5 percent of it is chloroprene. 90 percent of the collected material is 4-methoxy-2-chlorobutene and approximately 5 percent of it is methyl chloride, formed by the reaction of HCl and methanol split from the adduct.

Instead of employing methylacetylene as a starting material in the production of chloroprene, allene can be used. When allene is employed, a 4-methoxy-2-chloro-1-butene adduct is formed. This adduct is then cleaved to yield chloroprene.

EXAMPLE IV 50 grams of chloromethyl methyl ether (0.62 mole) dissolved in 30 milliliters of dichloromethane is added drop-wise to 65 grams of allene (1.6 moles), and 2 grams of zinc chloride (0.14 mole) dissolved in 100 milliliters of dichloromethane. The allene solution is contained in a 500 milliliter 3-neck round-bottom flask fitted with a magnetic stirrer, a thermometer, and an upright dry ice condenser. The temperature of the allene solution is maintained at about −20°C during the three hour period in which the chloromethyl methyl ether is added. Following the addition of the chloromethyl methyl ether, the reaction mixture is stirred overnight without cooling to thereby remove the unchanged allene which is collected in a dry ice trap. The products of this reaction are mixed with 1 liter of water to form a two-phase reaction mixture. The organic phase is separated, dried over anhydrous sodium sulfate, and distilled at reduced pressure. A fraction collected at 103°C at 621.2 millimeters is found by GLC analysis to be 94 percent pure 4-methoxy-2-chloro-1-butene having $N_D^{23}$ 1.4311. The infrared and nuclear magnetic resonance spectra verify that it is 4-methoxy-2-chloro-1-butene. Approximately a 5 percent yield of this material is obtained. Higher boiling products contain a large quantity of the compounds derived from the addition of a second mole of chloromethyl methyl ether to the original haloether adduct. Thus, 1,5-dimethoxy-3,3-dichloropentane is recovered from the organic phase by fractional distillation and conclusively identified by nuclear magnetic resonance and infrared spectra. It has $N_D^{24}$ 1.4554 and distills at 43°–44°C at 0.2 mm.

The gem-dichloro compounds can be hydrolyzed to form ketones suitable for use as plasticizers. The products can also generally be used in the preparation of polymers.

EXAMPLE V

Conversion of 4-methoxy-2-chloro-1-butene to chloroprene can be effected by passing the material into a hot tube just as described in Example I.

5 grams of 4-methoxy-2-chloro-1-butene (94 percent pure by GLC analysis) is distilled at a pressure of 100 mm Hg into a 1 inch × 18 inch Vigreaux column packed with ceramic beads and maintained at a temperature of 500°C. The effluent from the column is collected in a cold trap containing xylene (frozen) at a temperature of −78°C. Gas-liquid chromatography analysis of the warmed xylene solution shows that 1 gram of chloroprene is present. About 2 grams of 4-methoxy-2-chloro-1-butene is in the xylene solution and can be recovered for recycle by distillation.

4-methoxy-2-chloro-1-butene can also be cleaved to chloroprene by heating in N-methylpyrrolidone containing a few percent of anhydrous HCl. The procedure is precisely that of Example III. The yield would be on the order of 5+ percent, based on 4-methoxy-2-chloro-1-butene.

EXAMPLE VI

A gas stream (delivered from a tared cylinder; weight of charge is 57 grams) containing 35 percent by weight of methylacetylene, 35 percent by weight of allene and 30 percent inert material (mixture sold commercially by Dow Chemical Co.) is added over a period of 4 hours to a solution of 4 grams mercuric chloride dissolved in 80.5 grams of chloromethyl methyl ether maintained at a temperature of between 25°C and 35°C. Upon fractional distillation at a pressure of 28 millimeters of mercury 12 grams of a fraction boiling at 37.5°C – 38°C is obtained. This fraction, which contains approximately 50 percent by weight of 4-methoxy-2-chloro-2-butene and 50 percent by weight of 4-methoxy-2-chloro-1-butene, is then cleaved as in Example II to produce 2-chloro-1,3-butadiene.

EXAMPLE VII

Finely ground ferric chloride (0.05 mole) is stirred into one mole of bis(chloromethylether). Four moles of gaseous methylacetylene are bubbled into the mixture and the temperature is maintained at 10°C to 20°C. After 6 hours, nitrogen gas is bubbled through the mixture to remove the excess methylacetylene. The catalyst is then removed and the reaction mixture distilled under vacuum to recover bis(3-chloro-2-butenyl)ether which is converted to chloroprene by passing it through a 1 inch by 18 inch Vigreaux column packed with ceramic beads and maintained at a temperature of 525°C.

EXAMPLE VIII

Chloromethyl p-methoxyphenyl ether (1 mole) and finely ground zinc chloride (0.025 mole) are added to 500 ml of diethyl ether. 1-butyne (1 mole) is bubbled into the mixture while maintaining the temperature of the reaction mixture between 30°C and 40°C. After stirring for 10 hours, the catalyst is removed and the reaction mixture distilled under vacuum to recover 1-(p-methoxyphenoxy)-2-chloro-2-pentene, which upon thermal cleavage as in Example I yields 3-chloro-1, 3-pentadiene.

EXAMPLE IX 1-phenyl-1-propyne (2 moles) is added to a solution of chloromethyl dodecyl ether (1 mole) and ferric chloride (0.03 mole) in diethyl ether maintained at a temperature between 40°C and 55°C. After stirring for 15 hours, the ferric chloride is removed and the reaction mixture distilled under vacuum to isolate 2-methyl-3-chloro-3-phenyl-2-propenyl dodecyl ether and 2-phenyl-3-chloro-2-butenyl dodecyl ether. The latter haloether adduct is cleaved to 2-phenyl-3-chloro-1, 3-butadiene by heating the haloether adduct (0.5 mole) for 6 hours at a temperature of 140°C in a solution of N-methylpyrrolidone (1.5 moles) containing anhydrous HCl (0.3 mole).

EXAMPLE X

Titanium tetrachloride (0.05 mole) and bis(alpha-bromoethyl) ether (one mole) are mixed with diethyl ether. Two moles of 2-butyne are stirred into the reaction mixture while maintaining the temperature at 30°C to 40°C. After 12 hours, the catalyst is removed and the reaction mixture distilled under vacuum to recover the bis(1, 2-dimethyl-3-bromo-2-butenyl) ether which is formed. Upon thermal cleavage as in Example I, this haloether adduct yields 3-bromo-4-methyl-1,3-pentadiene.

While the invention has been described with reference to certain specific embodiments thereof, it is the intention to be limited only by the scope of the following claims.

What is claimed is:

1. A process for the preparation of halodiene compounds comprising reacting a chloro-methyl lower alkyl ether with a member selected from the group consisting of an acetylene having from two to nine carbon atoms selected from the group consisting of alkyl-substituted acetylene, aromatic hydrocarbon-substituted acetylene and halo-substituted acetylene, in the presence of a Friedel-Crafts catalyst at a temperature of from about −20°C. to about 70°C. to form a haloether adduct and splitting alcohol from the haloether adduct by heating said haloether adduct at a temperature in the range of from about 140°C. to about 170°C. in the presence of N-methylpyrrolidone and HCl, said N-methylpyrrolidone being present in an amount of at least 3 moles of N-methylpyrrolidone per mole of said haloether adduct and said N-methylpyrrolidone containing up to about 1 mole of said HCl per mole of said N-methylpyrrolidone, to thereby obtain said halodiene and said alcohol, and separating said halodiene from said alcohol.

2. The process of claim 1 wherein said chloromethyl lower alkyl ether is reacted with said acetylene at temperatures ranging from about 0°C. to about 25°C..

3. The process of claim 1 wherein the Friedel-Crafts catalyst is selected from the group consisting of zinc chloride, mercuric chloride, aluminum chloride, titanium chloride, and ferric chloride.

4. The process of claim 1 wherein alcohol is split by heating in the presence of a metal halide selected from the group consisting of an alkali metal halide, zinc chloride, mercuric chloride, aluminum chloride, titanium chloride and ferric chloride.

5. The process of claim 1 wherein said chloromethyl lower alkyl ether is reacted with the aromatic-hydrocarbon substituted acetylene.

6. The process of claim 1 wherein said chloromethyl lower alkyl ether is reacted with the halo-substituted acetylene.

7. The process of claim 1 wherein said chloromethyl lower alkyl ether is reacted with the alkyl substituted acetylene.

8. The process for preparing chloroprene comprising reacting chloromethyl methyl ether and methyl acetylene in the presence of a Friedel-Crafts catalyst at a temperature of from about −20°C. to about 70°C. to produce 4-methoxy-2-chloro-2-butene, splitting methyl alcohol from said 4-methoxy-2-chloro-2-butene by heating said 4-methoxy-2-chloro-2-butene at a temperature in the range of from about 140°C. to about 170°C. in the presence of N-methylpyrrolidone and anhydrous HCl, said N-methylpyrrolidone being present in an amount of at least 3 moles of N-methylpyrrolidone per mole of said 4-methoxy-2-chloro-2-butene and said N-methylpyrrolidone containing up to about 1 mole of anhydrous HCl per mole of N-methylpyrrolidone and separating the methyl alcohol and chloroprene.

9. The process of claim 8 wherein the Friedel-Crafts catalyst is a member selected from the group consisting of aluminum chloride, zinc chloride, mercuric chloride, titanium tetrachloride, and ferric chloride.

10. The process of claim 8 wherein said butene is heated at a temperature in the range of from about 140°C. to about 170°C. in the presence of at least 3 moles of N-methylpyrrolidone per mole of said compound containing between about 0.1 and about 0.2 mole of HCl per mole of N-methylpyrrolidone to thereby form chloroprene and methanol.

11. The process of claim 8 wherein said alcohol is split in the presence of a metal halide selected from the group consisting of an alkali metal halide, zinc chloride, mercuric chloride, aluminum chloride, titanium chloride and ferric chloride.

12. The process of claim 8 wherein said reacting is at a temperature of from about 0° C to about 25° C.

13. The process of claim 8 wherein said N-methylpyrrolidone contains between about 0.2 to about 0.5 moles of said HCl.

* * * * *